US009100410B2

(12) United States Patent
Srinivas et al.

(10) Patent No.: US 9,100,410 B2
(45) Date of Patent: Aug. 4, 2015

(54) SELECTIVE USE OF SHARED MEMORY FOR REMOTE DESKTOP APPLICATION

(71) Applicant: Microsoft Corporation, Redmond, WA (US)

(72) Inventors: Nelamangal Krishnaswamy Srinivas, Sammamish, WA (US); Robert Wilhelm Schmieder, Snoqualmie, WA (US); David Jaroslav Sebesta, Woodinville, WA (US); Neil Scott Fishman, Bothell, WA (US); Robert C. Elmer, Redmond, WA (US); Clark David Nicholson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/482,244

(22) Filed: Sep. 10, 2014

(65) Prior Publication Data
US 2014/0379793 A1 Dec. 25, 2014

Related U.S. Application Data

(63) Continuation of application No. 13/228,446, filed on Sep. 9, 2011, now Pat. No. 8,838,726.

(51) Int. Cl.
*G06F 15/16* (2006.01)
*H04L 29/08* (2006.01)
*G06F 9/54* (2006.01)
*G06F 9/44* (2006.01)
*H04L 29/06* (2006.01)

(52) U.S. Cl.
CPC .......... *H04L 67/1008* (2013.01); *G06F 9/4445* (2013.01); *G06F 9/544* (2013.01); *H04L 67/2842* (2013.01); *H04L 67/42* (2013.01); *G06F 2209/549* (2013.01)

(58) Field of Classification Search
USPC .................................. 709/200, 203, 217, 213
See application file for complete search history.

(56) References Cited

U.S. PATENT DOCUMENTS

| 5,872,966 | A | * | 2/1999 | Burg | 719/313 |
| 7,170,526 | B1 | * | 1/2007 | Johnson | 345/582 |
| 7,289,823 | B1 | * | 10/2007 | Kumar et al. | 455/550.1 |
| 7,526,410 | B2 | | 4/2009 | Anastassopoulos et al. | |
| 2002/0065916 | A1 | * | 5/2002 | Ooe et al. | 709/225 |

(Continued)

OTHER PUBLICATIONS

Aranha et al.; A Physically-Based Client-Server Rendering Solution for Mobile Devices retrieved at; http://www.pathtracing.com/wp-contact/uploads/Aranha-MobileDevices.pdf, Proceedings of the 6th International Conference on Mobile and Ubiquitous Multimedia, pp. 206-213.

(Continued)

*Primary Examiner* — El Hadji Sall
(74) *Attorney, Agent, or Firm* — Henry Gabryjelski; Kate Drakos; Micky Minhas

(57) ABSTRACT

A method includes determining if a server supporting an application and a client having remote desktop access to the server are on a same physical computing device. Upon determining that the server and the client are on the same physical computing device, graphics data related to the application is stored from the server to shared memory that is accessible by the server and by the client. Information to enable the client to retrieve the graphics data stored by the server in the shared memory is communicated from the server to the client.

20 Claims, 5 Drawing Sheets

(56) References Cited

U.S. PATENT DOCUMENTS

| | | | |
|---|---|---|---|
| 2003/0055605 A1 | 3/2003 | Pierce et al. | |
| 2007/0035632 A1* | 2/2007 | Silvernail et al. | 348/211.3 |
| 2008/0098064 A1 | 4/2008 | Sherinian | |
| 2008/0126072 A1* | 5/2008 | Hutchison et al. | 703/25 |
| 2008/0238929 A1 | 10/2008 | Abdo et al. | |
| 2009/0167635 A1 | 7/2009 | Want et al. | |
| 2009/0249214 A1 | 10/2009 | Best et al. | |
| 2009/0249219 A1 | 10/2009 | Best et al. | |
| 2009/0307428 A1 | 12/2009 | Schmieder et al. | |
| 2010/0011055 A1 | 1/2010 | Lin et al. | |
| 2010/0138744 A1 | 6/2010 | Kamay et al. | |
| 2011/0219083 A1* | 9/2011 | Nishi | 709/206 |
| 2013/0067019 A1 | 3/2013 | Srinivas et al. | |

OTHER PUBLICATIONS

Bansal et al.; "Server Coordinated Predictive Buffer Management Scheme to Reduce Bandwidth Requirement for Synthetic Multimedia Movies over the Internet" retrieved at http://citeseerx.ist.psu.edu/viewdoc/download?doi=10.1.184.1450&rep=rep1&type=pdf Procee, pp. 831-837.

Hards, B, "The Desktop Sharing Handbook," Retrieved at; http://docs.kde.org/stable/en/kdenetwork/krfb/krfb.pdf; Retrieved date Jun. 13, 2011, 14 pages.

Li et al., "A High-Performance Inter-Domain Data Transferring System for Virtual Machines" Retrieved at; http://ojs.academypublisher.com/index.php/jsw/article/viewFile/0502206213/1553; Journal of Software, vol. 5, No, 2, Feb. 2010, Academy Publisher, pp. 206-213.

* cited by examiner

SELECTIVE USE OF SHARED MEMORY FOR REMOTE DESKTOP APPLICATION

CLAIM OF PRIORITY

The present application claims priority from and is a divisional application of U.S. patent application Ser. No. 13/228,446, filed on Sep. 9, 2011 and entitled "SELECTIVE USE OF SHARED MEMORY FOR REMOTE DESKTOP APPLICATION," the contents of which are expressly incorporated herein by reference in their entirety.

BACKGROUND

Remote desktop services is a service offered by an operating system that may be executed by one or more computers. The remote desktop services include a server component and a client component and allow a user (i.e. a user at a computer that is executing the client component) to access applications and data on a remote computer (i.e. a computer that is executing the server component) over a network. Certain applications or even an entire desktop on the remote computer is made accessible to the user computer. A communication protocol, such as remote desktop protocol, may be used to communicate between the user computer and the remote computer over the network. For example, input received by a user interface of the user computer may be redirected over the network to the remote computer (e.g. a server where application execution takes place).

In certain applications or environments, the client component and the server component of the remote desktop service may be executed on the same physical computer (either natively or using virtual machines). In this case, the remote desktop services may continue to communicate between the client component and the server component over a network, but since the client component and the server component are on the same physical computer, the network source and destination are the same (e.g. the network port of the computer may be looped back so that messages sent by the client component are received by the server component). Use of the network port loop back method for communications between a client component and a server component on the same physical computer consumes processing and network resources.

SUMMARY

Systems and methods of graphics data transfer between a server and a remote desktop client that are running on the same machine are disclosed. Graphics data may be stored by the server to a shared memory, such as a desktop rendering buffer, that is accessible to the remote desktop client to avoid delays and resource usage associated with transporting graphics data via a network loopback interface. The server can provide information to the remote desktop client to enable the client to map the shared memory to a memory space of the remote desktop client.

In a particular embodiment, a method includes determining if a server supporting an application and a client having remote desktop access to the server are on a same physical computing device. The method also includes, upon determining that the server and the client are on the same physical computing device, storing graphics data related to the application from the server to a shared memory buffer that is accessible by the server and by the client. The method further includes communicating information from the server to the client to enable the client to retrieve the graphics data stored by the server in the shared memory buffer.

In another particular embodiment, an apparatus includes a processor configured to execute an operating system desktop rendering engine that is configured to provide graphics data related to a desktop environment. The apparatus includes a graphics encoding engine. The graphics encoding engine includes a graphics encoder coupled to a remote desktop client via an encoded graphics communication channel. The graphics encoding engine also includes a graphics rendering module having access to a shared memory buffer. The shared memory buffer is configured to receive and store graphics data from the graphics rendering module. The shared memory buffer is further configured to provide the stored graphics data to a graphics rendering engine of the remote desktop client. The graphics encoding engine further includes a switch configured to selectively send the graphics data from the operating system desktop rendering engine to the graphics encoder, such that the graphics data is encoded and communicated via the encoded graphics communication channel to the remote desktop client, or to the graphics rendering module, such that the graphics data is stored in the shared memory buffer and is available for access by the rendering engine of the remote desktop client. The switch is further selectively connected to the graphics rendering engine of the remote desktop client via a redirection control channel.

In another particular embodiment, a computer readable storage device includes instructions executable by a computer to detect at a server, a client connection to the server and to determine whether the client supports local redirection communication. The instructions are also executable by the processor, in response to determining that the client supports local redirection communication, to store graphics data from the server into a shared memory buffer and to communicate information to the client to enable the client to access the graphics data stored at the shared memory buffer. The instructions are also executable by the processor to receive a confirmation from the client via a communication channel that the client successfully accessed the graphics data from the shared memory buffer and, upon receiving the confirmation, to discontinue sending graphics data to the client through an encoded graphics channel and to begin sending further graphics data from the server to the client via the shared memory buffer.

BRIEF DESCRIPTION OF THE DRAWINGS

The present disclosure may be better understood, and its numerous features and advantages made apparent to those skilled in the art, by referencing the accompanying drawings.

The use of the same reference symbols in different drawings indicates similar or identical items.

DETAILED DESCRIPTION

Figure 1:
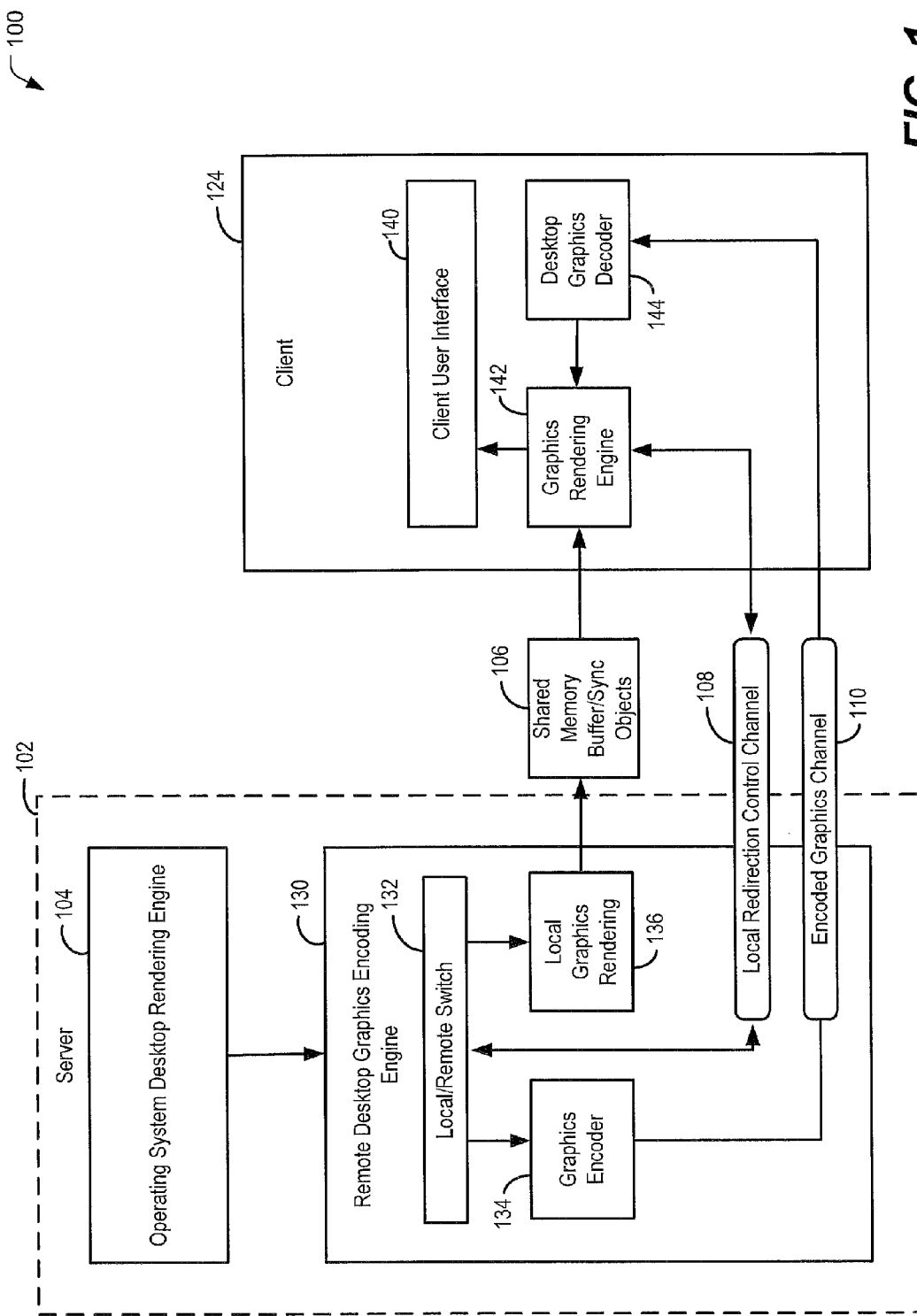
FIG. 1 is a block diagram of a particular embodiment of a system that includes a server, a client, and a shared memory.

Referring to FIG. 1, a particular illustrative embodiment of an apparatus 100 is shown. The apparatus 100 includes a server 102 and a client 124. The server 102 includes an operating system desktop rendering engine 104 and a remote desktop graphics encoding engine 130. The remote desktop graphics encoding engine 130 includes a local/remote switch 132, a remote desktop graphics encoder 134, and a local graphics rendering module 136. The server 102 is coupled to the client 124 via a shared memory 106.

The client 124 is a remote desktop client that includes a client user interface 140. The client 124 also includes a graphics rendering engine 142 and a desktop graphics decoder 144. The graphics rendering engine 142 has an input configured to retrieve or otherwise access data stored within the shared memory 106. In a particular embodiment, the shared memory 106 is a video buffer or a buffer that stores data objects or other graphics data.

The server 102 may communicate with the client 124 via an encoded graphics channel 110, via a local redirection control channel 108, or a combination thereof. Each of the communication channels 108, 110 may be a part of or otherwise implemented by a network connection such as an Ethernet connection to an Ethernet port of a computer that includes the server 102. For example, the apparatus 100 may be a computer that includes the server 102 and the client 124.

The apparatus 100 includes a processor that is configured to execute the operating system desktop rendering engine 104. The operating system desktop rendering engine 104 is configured to provide graphics data related to a desktop environment. For example, the server 102 may support a desktop environment by use of the operating system desktop rendering engine 104, and the server 102 may be configured to provide graphics data related to such desktop environment. For example, the server 102 may be a server component of a remote desktop service of an operating system of a computer.

The remote desktop graphics encoding engine 130 includes the graphics encoder 134 that is coupled to the desktop graphics decoder 144 of the client 124 via the encoded graphics communication channel 110. The shared memory 106 is configured to receive and store graphics data provided by the local graphics rendering module 136. The shared memory 106 is further configured to provide the stored graphics data to the graphics rendering engine 142 of the client 124.

The remote desktop graphics encoding engine 130 further includes the local/remote switch 132 that is configured to selectively send graphics data received from the operating system desktop rendering engine 104 to either the remote desktop graphics encoder 134 or to the local graphics rendering module 136. When the switch 132 is configured to send the graphics data to the graphics encoder 134, the graphics data is encoded and communicated via the encoded graphics communication channel 110 to the desktop graphics decoder 144 of the client 124. For example, the encoded graphics data generated by the remote desktop graphics encoder 134 may be communicated by the encoded graphics channel 110 and provided to the desktop graphics decoder 144 within the client 124.

Alternatively, when the local/remote switch 132 is configured to route the graphics data received from the operating system desktop rendering engine 104 to the local graphics rendering module 136, the graphics data from the local graphics rendering module 136 is stored in the shared memory 106 and is available for access by the graphics rendering engine 142 of the client 124. In addition, the switch 132 is configured to communicate data or control bits to the graphics rendering engine 142 of the client 124 via the local redirection control channel 108. In particular, the switch 132 may communicate or receive control information via the local redirection control channel 108. The local redirection control channel 108 may be used to communicate information about graphics data stored or to be stored within the shared memory 106. For example, the information may include an object, a handle, or a memory location associated with graphics data stored or to be stored in the shared memory 106. As a further example, the local redirection control channel 108 may communicate to the client 124 location information associated with data stored within the shared memory buffer 106 that has changed since a prior storage event. Thus, the graphics rendering engine 142 receives information communicated via the local redirection control channel 108 in order to enable the client 124 to retrieve the graphics data stored by the server 102 in the shared memory 106. The graphics rendering engine 142 may thereafter acquire the stored graphics data from the shared memory 106 by use of the information received from the local redirection control channel 108.

The apparatus 100 may operate according to whether the client 124 is detected to be located on the same physical computer as the operating system desktop rendering engine 104. Upon determining that the client 124 supports local redirection of graphics data and is located on the same physical computer, the switch 132 is configured to bypass the graphics encoder 134 and to bypass the encoded graphics communication channel 110 and to instead route the graphics data in a manner to store the graphics data generated by the local graphics rendering module 136 in the shared memory 106. Control information related to the graphics data or to updates thereto (for storage in the shared memory 106) is communicated via the local redirection control channel 108 to the graphics rendering engine 142 of the client 124.

In a particular illustrative embodiment, information related to the graphics data stored or to be stored in the shared memory 106 is communicated to the client 124 via the encoded graphics communication channel 110 prior to the switch 132 being triggered to bypass the graphics encoder 134 and to bypass the encoded graphics communication channel 110. In a particular embodiment, the shared memory 106 is a video buffer and the information communicated via the encoded graphics channel 110 or the local redirection control channel 108 to the client 124 includes a handle associated with the video data stored or to be stored in the video buffer 106.

By selectively routing the graphics data via the shared memory 106 when the client 124 is detected to be on a same physical computer as the server 102, a speed of data transfer from the server 102 to the client 124 may be increased. In addition, power consumption and network usage may be reduced as compared to implementing a network loop back at the encoded graphics channel 110.

Figure 2:
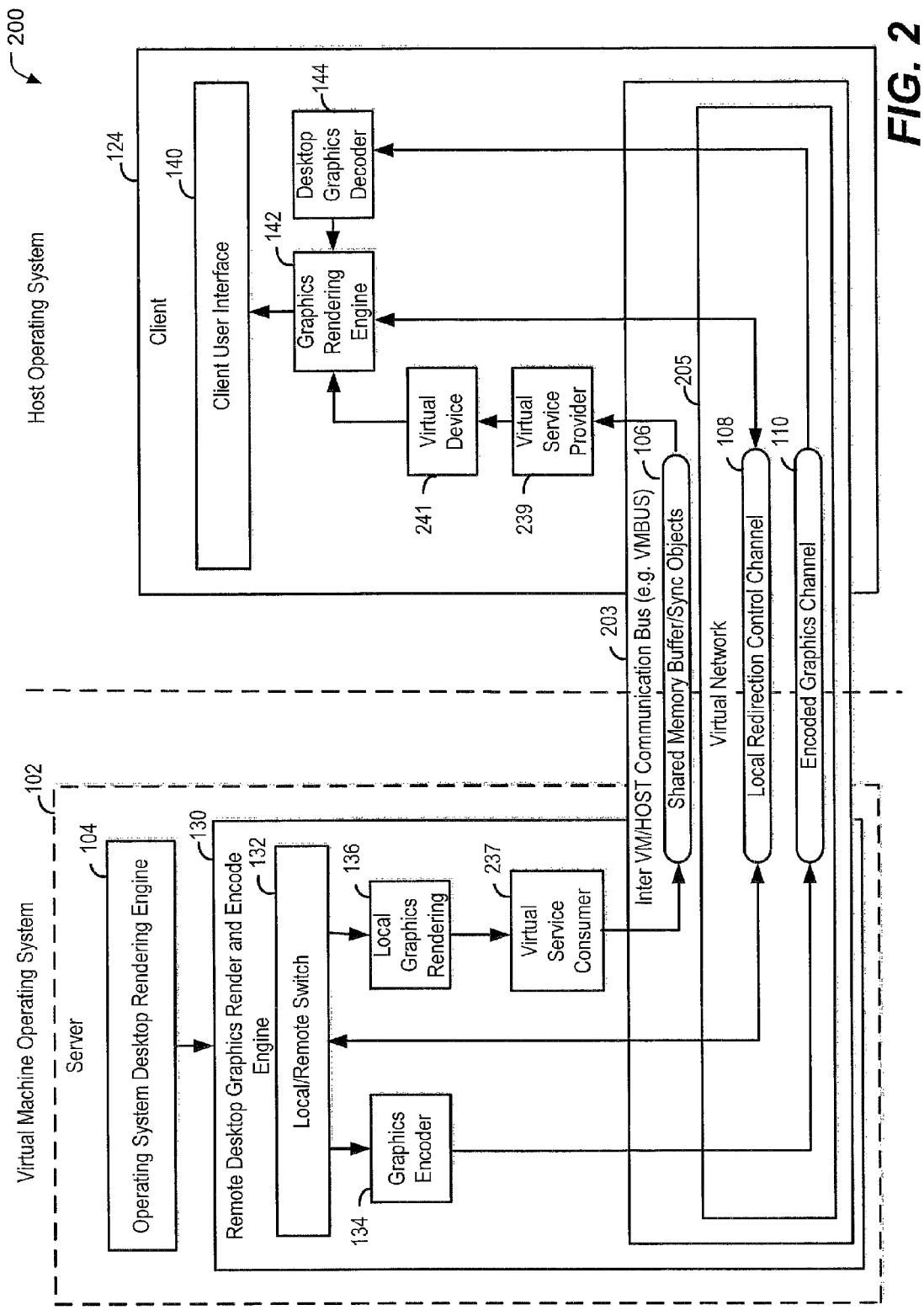
FIG. 2 is a block diagram of another embodiment of a system that includes a server, a client, and a shared memory.

Referring to FIG. 2, a particular embodiment of a system 200 is illustrated. The system 200 includes many of the components of the system 100 of FIG. 1 where like components have the same reference numbers. The system 200 includes a shared memory buffer 106 between a server 102 (including a virtual machine operating system (OS)) and a host operation system client 124 (including a host OS). In addition to the components in FIG. 1, the system 200 includes a virtual service provider 239, a virtual service consumer 237, and a virtual device 241, which are used to achieve a "flat" virtual address mapping between the virtual machine OS of the server 102 and the host OS of the client 124 to access the shared buffer 106. A VMBUS 203 is used to enable the virtual service provider 239 to communicate with the virtual service consumer 237 and supports access to the shared memory buffer 106. A virtual network 205 is used to provide the local redirection control channel 108 and the encoded graphics channel 110. The virtual device 241 receives data from the virtual service provider 239 and provides output to the graphics rendering engine 142. The system 200 supports interaction between a virtual machine operating system and a host operating system on the same physical computer.

Figure 3:
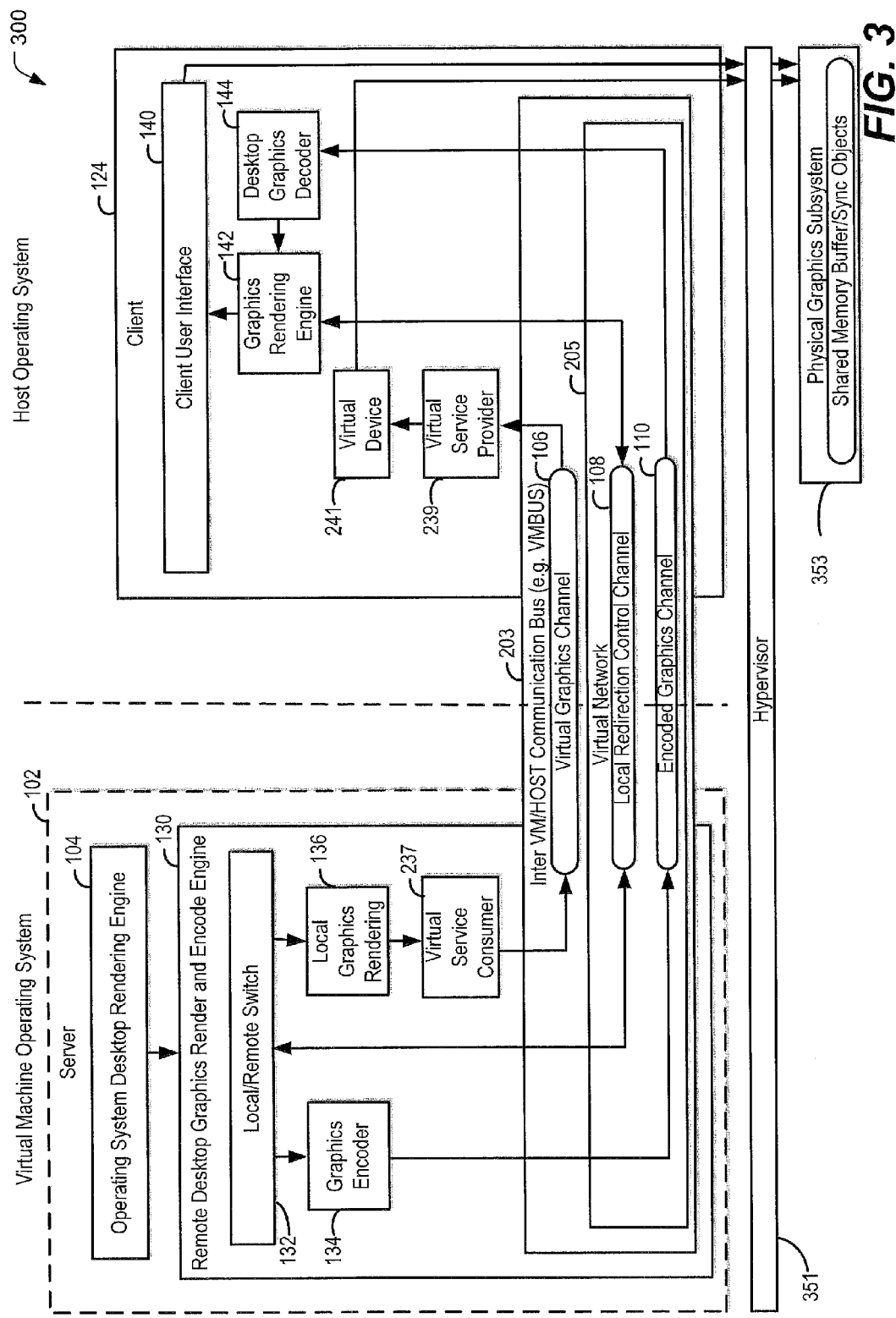
FIG. 3 is a block diagram of another embodiment of a system that includes a server, a client, and a shared memory.

FIG. 3 illustrates another embodiment of a system 300 that includes a server 102, a client 124, and shared memory 106. The system 300 is similar to the system 200 of FIG. 2, but includes additional elements of a hypervisor 351 and a physical graphics subsystem 353. The physical graphics subsystem 353 includes a display buffer and may be used to allow the server 102 with the virtual machine OS direct access to physical graphics devices (e.g. a graphics card and a display associated with the user interface 140 of the client 124). The hypervisor 351 allows the virtual device 241 to communicate with the physical graphics subsystem 353. The system 300 allows the server 102 to directly interact with the graphics subsystem 353 of the client 124, supporting efficient communication between the server 102 and the client 124 by use of the shared memory 106. For example, transfer of graphics to the physical graphics subsystem 353 can be performed either as a memory-to-memory transfer or by issuing graphics processing unit (GPU) specific instructions to create an in-GPU memory representation for the graphics (e.g. for a GPU within the physical graphics subsystem 353).

Figure 4:
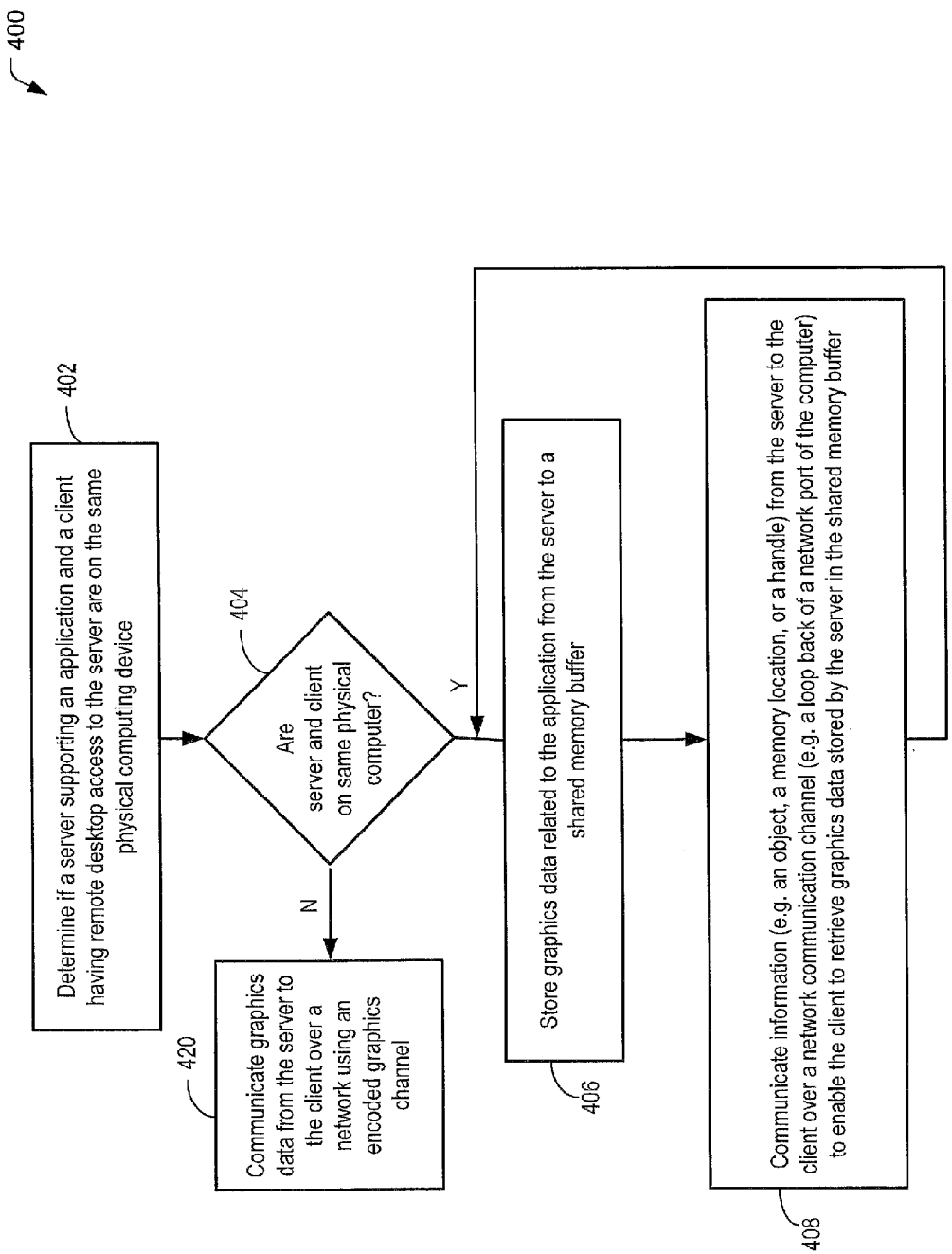
FIG. 4 is a flow chart that illustrates a particular embodiment of a method of communication between a server and a client.

Referring to FIG. 4, a particular embodiment of a method of operating a server that supports a desktop application and that supports a remote desktop client is shown. The method 400 includes determining if the server supporting a desktop application and a client having remote desktop access to the server are in a same physical computing device, at 402. If the server and the client are not on the same physical computing device, as determined at decision 404, then graphics data is communicated from the server to the client over a network using an encoded graphics channel, at 420. For example, if the server 102 and the client 124 of FIG. 1 are not on the same physical computer device then graphics data may be communicated by the remote desktop graphics encoding engine 130 to the client 124 using the encoded graphics channel 110. In this case, the encoded graphics channel 110 is supported by a network communication interface between the server 102 and the client 124 that is on a different physical computer.

Referring to decision step 404, if the server and the client are on the same physical computer, then the method 400 further includes storing graphics data related to the desktop application from the server to a shared memory buffer, at 406. For example, after determining that the server 104 and the client 124 are on the same physical computer (e.g. the server 102 and the client 124 are within a single apparatus 100 which is a single physical computer), then the graphics data from the operating system desktop rendering engine 104 that represents a desktop application or an entire desktop environment supported by the server 102 is stored in the shared memory 106.

In a particular illustrative embodiment, the server may create the shared memory 106 and the size of the shared memory 106 may correspond to a size of a desktop environment supported by the server 102. For example, the server 102 may request allocation of a portion of a memory where the size of the portion of the memory allocated is determined based on a size of a desktop application or multiple applications of a desktop environment supported by the server 102.

The method 400 further includes communicating information from the server to the client over a network communication channel (e.g. a loop back of a network port of the computer) to enable the client to retrieve graphics data stored by the server in the shared memory buffer, at 408. For example, information may be communicated from the server 102 to the client 124 over the encoded graphics channel 110 or over the local redirection control channel 108. In a particular illustrative embodiment, the encoded graphics channel 110 and the local redirection channel 108 is incorporated within or otherwise supported by a network communication channel (e.g. a loop back of a network port of the computer). The information communicated over the encoded graphics channel 110 or over the local redirection control channel 108 enables the client 124 to retrieve the graphics data stored by the server 102 in the shared memory buffer 106. For example, the information communicated over the encoded graphics channel 110 to the client 124 may include memory location information, a data object, or a handle that is associated with graphics data stored within the shared memory 106.

In a particular embodiment, the server 102 may be located within a first partition of memory within the apparatus 100 and the client 124 may be located within a second partition of the memory of the apparatus 100. The shared memory 106 may be mapped using a guest-host mechanism. In this scenario, the client is running in the root partition, and the server is running in a guest partition. The client would create a mapping to shared memory that could be accessed by the server running in the guest partition In a particular embodiment, the client is executed on a hyper-v host and the server is executed as a guest virtual machine on the hyper-v host. The client may map the shared memory 106 to a memory space of the client so that the client may access the graphics data stored therein. In another embodiment, the client and the server are on the same operating system without virtualization.

In a particular illustrative embodiment, the graphics data includes content displayed or that is to be displayed by the desktop application. The client 124 (e.g. a remote desktop client) may render the graphics data retrieved from the shared memory 106 to a display device. For example, the client may be a remote desktop client of the server and the remote desktop client may be configured to display the graphics data provided by the server to the client via the shared memory 106 on a display device. In a particular illustrative embodiment, the server 102 and the client 124 may exchange synchronization data so that the client 124 and the server 102 have exclusive use of the shared memory 106.

In a particular embodiment, the client 124 communicates with the server 102 using a remote frame buffer protocol over the local redirection control channel 108 to enable the client 124 to share the desktop environment supported by or associated with the server 102. The client is configured to display the graphics data received from the server at a display device. In a particular illustrative embodiment, the client has control over a pointer or other user control displayed on the display device. Thus, the user of the remote desktop client 124 may control the desktop environment supported by the server 102 by use of control elements, such as a pointer device (e.g. a mouse pointer) of the desktop environment.

Figure 5:
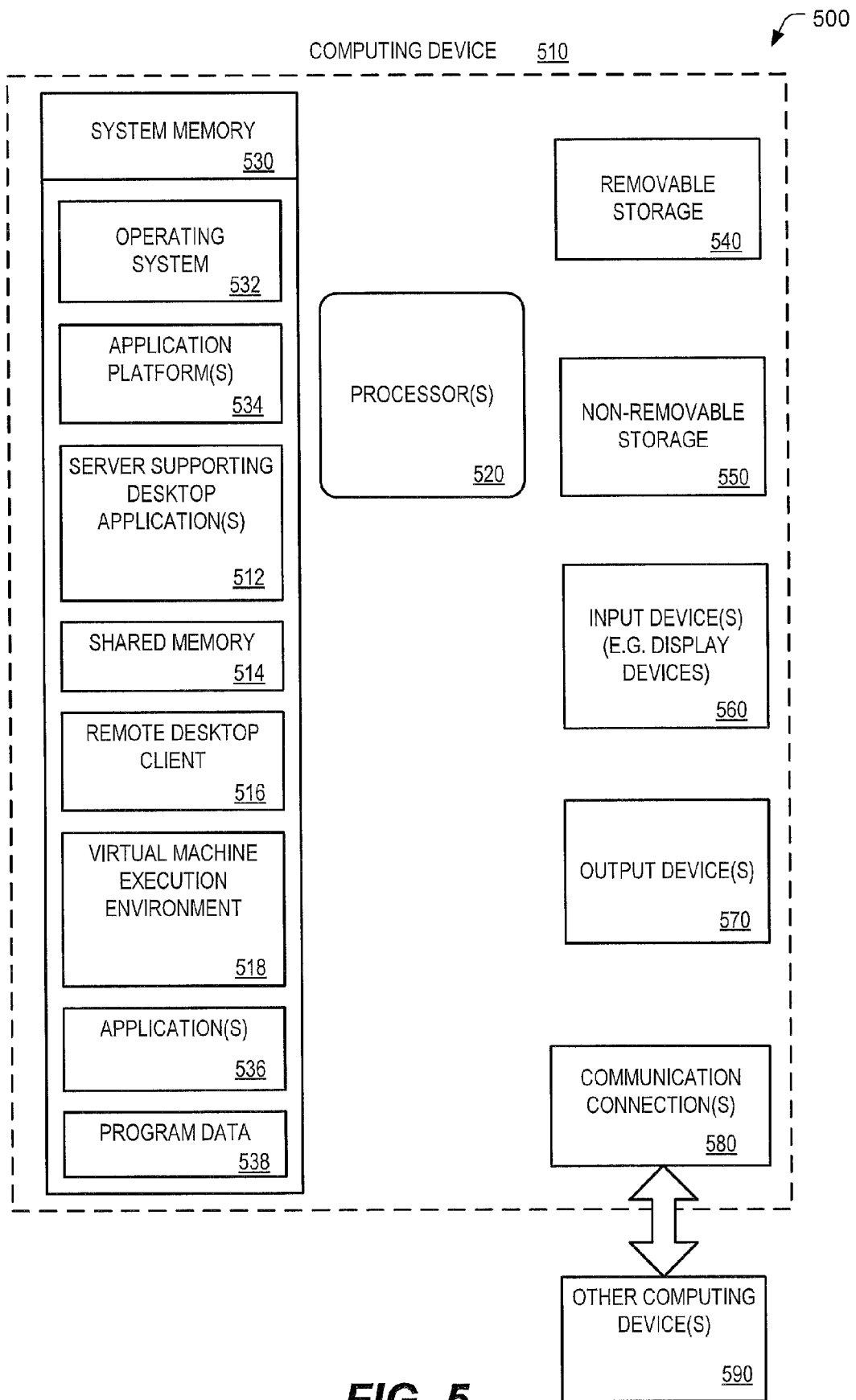
FIG. 5 is a diagram that illustrates a representative computing device.

FIG. 5 depicts a block diagram of a computing environment 500 including a computing device 510 operable to support embodiments of systems, methods, and computer program products according to the present disclosure.

The computing device 510 includes at least one processor 520 and a system memory 530. Depending on the configuration and type of computing device, the system memory 530 may be volatile (such as random access memory or "RAM"), non-volatile (such as read-only memory or "ROM," flash memory, and similar memory devices that maintain stored data even when power is not provided), or some combination of the two. The system memory 530 typically includes an operating system 532, one or more application platforms 534, one or more applications 536, and program data 538. The system memory 530 also includes a server supporting desktop application(s) 512, a shared memory 514, a remote desktop client 516, and a virtual machine execution environment 518. In an illustrative embodiment, the server 512, the remote desktop client 516, the virtual machine execution environment 518, or any combination thereof, may include instructions that are executable by the processor(s) 520 to perform the functions and methods disclosed herein. For example, functionality for the server 102 and the client 124 of any of FIGS. 1-3 may be performed by applications (such as the server 512 and the remote desktop client 516) or by the operating system 532.

The computing device 510 may also have additional features or functionality. For example, the computing device 510 may include removable and/or non-removable additional data storage devices, such as magnetic disks, optical disks, tape devices, and standard-sized or flash memory cards. Such additional storage is illustrated in FIG. 5 by removable storage 540 and non-removable storage 550. Computer storage media may include volatile and/or non-volatile storage and removable and/or non-removable media implemented in any technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 510. Any such computer storage media may be part of the computing device 510.

The computing device 510 may also have input device(s) 560, such as a keyboard, mouse, pen, voice input device, touch input device, motion or gesture input device, etc, connected via one or more wired or wireless input interfaces. In an illustrative embodiment, the input device(s) 560 may receive user input, such as input related to the remote desktop client 516. Output device(s) 570, such as a display, speakers, printer, etc. may also be connected via one or more wired or wireless output interfaces. The output devices 570 may include one or more display devices. For example, a first display device may be associated with the server 512 and a second display device may be associated with the remote desktop client 516. In a further example, the server 512 may be executed by a first virtual machine within the virtual machine execution environment 518 and the remote desktop client 516 may be executed within a second virtual machine within the virtual machine execution environment 518. The virtual machine environment may be implemented by the system 200 of FIG. 2 or the system of FIG. 3, as illustrative examples.

The computing device 510 also contains one or more communication connections 580 that allow the computing device 510 to communicate with other computing devices 590 over a wired or a wireless network (or in a loopback mode to communicate with the computing device 510). The system memory 530 may be a computer readable storage device that includes instructions executable by the processor 520 or other computer or computing device to perform the method 400 of FIG. 4. The server supporting the desktop application(s) 512 and the remote desktop client 516 may be implemented by instructions that are executable by the processor 520, where the server 512 and the remote desktop client 516 are located within a single computing device such as the computing device 510. For example, the instructions stored within the system memory 530 may be executable by the processor 520 to detect, at the server 512, that the remote desktop client 516 is in communication with the server 512. For example, referring to FIG. 1, the server 102 may detect a connection by the client 124. The instructions stored within the computer readable storage device 530 may be executable by the processor 520 to determine whether the client supports local redirection communication. For example, the server 102 may determine whether client 124 supports local redirection, such as by receipt of a response to a command or request sent from the server 102 to the client 124. As a further example, in response to determining that the remote desktop client 516 supports local redirection communication, graphics data from the server 512 (e.g. graphics data associated with desktop applications supported by the server 512) may be stored into the shared memory 514. Information related to the graphics data stored within the shared memory 514 may be communicated to the remote desktop client 516 in order to enable the remote desktop client 516 to access the graphics data stored at the shared memory 514.

The instructions within the system memory 530 are further executable by the processor 520 to receive a confirmation from the remote desktop client 516 via a communication channel, such as a channel with the communication connection 580 or other connection (not shown), that the remote desktop client 516 successfully accessed the graphics data from the shared memory 514. Upon receiving the confirmation from the remote desktop client 516, the server 512 may discontinue sending graphics data to the remote desktop client 516 through an encoded graphics channel, such as the communication connection 580 which may be looped back on itself. In this case, further communications of graphics data between the server 512 and the remote desktop client 516 are performed by storing and retrieving data at the shared memory 514. In a particular embodiment, the remote desktop client 516 is configured to share a desktop environment of the server 512 and the remote desktop client 516 is configured to display graphics data associated with the desktop environment to a display device, such as a display device including one of the output devices 570. In addition, the remote desktop client 516 may have control over a pointer or other input device, such as any of the input devices 560, and may use the input device in connection with the display device to control aspects of the desktop environment of the server 512. It will be appreciated that not all of the components or devices illustrated in FIG. 5 or otherwise described in the previous paragraphs are necessary to support embodiments as herein described. For example, the removable storage 540 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   detecting, at a server, a client connection to the server;
   determining whether the client supports local redirection communication;
   storing graphics data from the server into a shared memory responsive to determining that the client supports local redirection communication;
   communicating information to the client to enable the client to access the graphics data stored at the shared memory;
   receiving an indication that the client successfully accessed the graphics data from the shared memory; and
   discontinuing sending graphics data to the client through an encoded graphics channel and begin sending further graphics data from the server to the client via the shared memory.

2. The method of claim 1, wherein the server is executed on a first virtual machine and the client is executed on a second virtual machine.

3. The method of claim 1, wherein the client renders the graphics data retrieved from the shared memory at a display device.

4. The method of claim 1, wherein the information includes an object, a handle, or a memory location, and wherein the information is communicated from the server to the client over a network communication channel.

5. The method of claim 1, wherein the server communicates to the client, via a local redirection channel, locations in the shared memory including data that has changed since a prior storage event.

6. The method of claim 1, wherein the server is in a first partition and the client is in a second partition, and wherein the shared memory is mapped using guest-host mechanisms.

7. The method of claim 1, wherein the client is a remote desktop client of the server, and wherein the remote desktop client is configured to display the graphics data provided to the client via the shared memory on a display device.

8. The method of claim 1, wherein the client is executed on a host and the server is executed as a guest virtual machine on the host.

9. The method of claim 1, wherein the server maps the shared memory to a memory space of the client.

10. The method of claim 1, wherein the shared memory is a video buffer or a display buffer on a graphics subsystem.

11. The method of claim 1, wherein the server and the client exchange synchronization data so that the client and the server have exclusive use of the shared memory.

12. The method of claim 1, wherein the server creates the shared memory, wherein a size of the shared memory corresponds to a size of a desktop environment, and wherein the desktop environment is supported by the server.

13. The method of claim 12, wherein the client is a remote desktop client and the client communicates with the server using a remote frame buffer protocol to enable the client to share the desktop environment, wherein the client is configured to display the graphics data at a display device, and wherein the client has control over a pointer displayed on the display device.

14. A computer readable storage device including instructions executable by a computer to:
   detect at a server, a client connection to the server;
   determining whether the client supports local redirection communication;
   in response to determining that the client supports local redirection communication:
   store graphics data from the server into a shared memory; and
   communicate information to the client to enable the client to access the graphics data stored at the shared memory;
   determine that the client successfully accessed the graphics data from the shared memory; and
   in response to determining that the client successfully accessed the graphics data from the shared memory, discontinue sending graphics data to the client through an encoded graphics channel and begin sending further graphics data from the server to the client via the shared memory.

15. The computer readable storage device of claim 14, wherein the server and the client are located on the computer.

16. The computer readable storage device of claim 14, wherein the client is a remote desktop client configured to share a desktop environment of the server, wherein the client is configured to display the graphics data at a display device, and wherein the client has control over a pointer displayed on the display device.

17. An apparatus comprising:
a server comprising a processor; and
a memory coupled to the processor, the memory storing instructions that when executed by the processor cause the server to:
detect a client connection to the server;
determine whether the client supports local redirection communication;
responsive to determining that the client supports local redirection communication, store graphics data into a shared memory and communicate information to the client to enable the client to access the graphics data stored at the shared memory;
determine that the client successfully accessed the graphics data from the shared memory; and
upon determining the client successfully accessed the graphics data from the shared memory, discontinue sending graphics data to the client through an encoded graphics communication channel and begin sending further graphics data from the server to the client via the shared memory.

18. The apparatus of claim 17, wherein upon detecting that the client is located on a same physical computer as the server and upon determining that the client supports local redirection communication of the graphics data, a switch is triggered to bypass the encoded graphics communication channel and to instead store the graphics data in the shared memory, and wherein control information related to updates to the shared memory is communicated via a redirection control channel to the client.

19. The apparatus of claim 18, wherein information related to the graphics data stored in the shared memory is communicated to the client via the encoded graphics communication channel prior to the switch being triggered to bypass a graphics encoder and the encoded graphics communication channel.

20. The apparatus of claim 19, wherein the shared memory is a video buffer, and wherein the information is a handle associated with video data to be stored to the video buffer.

* * * * *